May 1, 1956

W. H. KING, JR 2,743,898

MAGNETIC VALVE FOR CONTROL OF FLUID
OR FLUIDIZED SOLIDS FLOW

Filed Oct. 30, 1953

William H. King Jr.  Inventor

By *George J Silhan*  Attorney

May 1, 1956

W. H. KING, JR 2,743,898

MAGNETIC VALVE FOR CONTROL OF FLUID
OR FLUIDIZED SOLIDS FLOW

Filed Oct. 30, 1953

William H. King Jr.  Inventor

By George J. Hickey  Attorney

United States Patent Office 2,743,898
Patented May 1, 1956

2,743,898
MAGNETIC VALVE FOR CONTROL OF FLUID OR FLUIDIZED SOLIDS FLOW

William H. King, Jr., Florham Park, N. J., assignor to Esso Research and Engineering Company, a corporation of Delaware Application October 30, 1953, Serial No. 389,280

7 Claims. (Cl. 251—139)

This invention relates to a method and means for controlling the flow of fluids or fluidized solids.

The use of valves such as gate valves, globe valves, and slide valves is well known in industrial operations as a means of controlling the flow of fluids and fluidized solids. However, in certain instances the performance of such valves has not been entirely satisfactory due to extreme corrosion, abrasion and erosion of valve parts. In recent years the utilization of fluidized solids in such proceses as catalytic cracking of petroleum fractions, Fischer-type synthesis, etc. has become prominent. Severe wear of valves, such as slide valves which are commonly employed in these processes, has been experienced. Such wear constitutes a major operating problem since it necessitates the interruption of operations while the valve parts are replaced.

An object of the present invention is to avoid such difficulties by providing a type of valve in which the valve parts in contact with the fluid or fluidized solids are readily replaceable without necessitating the shutdown of operations. A further object of the present invention is to provide means for controlling the flow of fluid and fluidized solids which does not require the conventional valve packing and lubrication.

The present invention is for a type of valve operating on a magnetic principle. Briefly stated, the present invention comprises a magnetic field produced by at least two magnets arranged on the outside of a conduit, which is adapted to convey fluids or fluidized solids, and magnetically susceptible particles held to the inside surface of the conduit by the magnetic field. By varying the distribution of the magnetic field, the arrangement of magnetic particles within the conduit is regulated and the rate of flow of fluids or fluidized solids passing through the conduit is thereby controlled.

The magnetic valve is closed by concentrating the magnetic particles at one point in the conduit and opened by distributing the magnetic particles over the interior surface of the conduit. The magnetic field may be produced by permanent magnets, electro-magnets or electric coils wound around the conduit. The magnetic particles may be made of magnetic materials such as iron, cobalt, nickel, mixtures thereof, alloys, magnetic compounds, etc. It is preferable to use particles of varying sizes, as a more compact layer may be produced. It is also preferable that the particles be spherical in form to facilitate their movement in the conduit when varying the arrangement of the particles.

The conduit may consist of either a magnetic or nonmagnetic substance. If the conduit is made of a magnetic material it will become a secondary magnet. However, in this case, the electric power consumption required when employing an electro-magnet is higher than in the case where a non-magnetic conduit is employed due to leakage of the magnetic field along the conduit. Therefore, it is preferable to use a non-magnetic conduit or to magnetically insulate the section of the conduit adjacent to the magnetic field from the remainder of the conduit.

In the event of corrosion, abrasion, erosion or loss of some of the magnetic particles, additional magnetic particles may be introduced to the system to maintain a constant amount of these particles. These particles may be introduced with the fluid or fluidized solids entering the system or they may be added by means of an inlet in the conduit immediately upstream of the magnetic valve. The added particles will be carried to the location of the magnetic field at which point they will be held firmly to the wall of the conduit by the magnetic field. Loss of these magnetic particles from the magnetic valve can be essentially eliminated by employing a sufficiently strong magnetic field. Where it is undesirable on account of contamination to contact the fluid or fluidized solids with the magnetic particles the particles may be coated with some other material. For example, in the case of catalytic cracking of hydrocarbons where such catalysts as silica-alumina, silica-magnesia or the like are circulated as fluidized solids, it may be desirable to coat the magnetic particles with a substance having the composition of the catalyst.

One specific form of the present invention employs three separate magnets. By varying the relative strengths of the three magnets the magnetic valve may be made to open and close. Operation of the magnetic valve may be readily understood by reference to the drawings in which.

Figure 2:
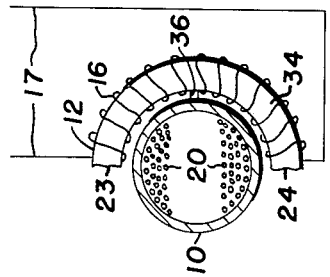
Fig. 2 represents a transverse vertical cross section of the same conduit containing the valve made in accordance with the present invention also showing the valve in the open position.

Referring now to the drawings, reference character 10 designates a conduit adapted for conveying fluids or fluidized solids. Conduit 10 is preferably made of a nonmagnetic material such as stainless steel and is connected to lines 46 and 47 at connections 48 and 49, respectively. Lines 46 and 47 will normally be made from a magnetic material such as iron or ordinary steel. It is to be understood that conduit 10 may be arranged in a horizontal, vertical, or sliping position. A fluid or fluidized solid may be passed through conduit 10 and lines 46 and 47 in the direction indicated by the arrow shown within conduit 10. In this specific form of the invention, the magnetic field is produced by means of three separate electro-magnets 11, 12 and 13 arranged about conduit 10. It is desirable to have the electro-magnets arranged as closely as possible to the outside wall of conduit 10 to obtain the most effective utilization of the magnetic field. Each electro-magnet comprises a coil and a core. The coil is formed by winding an insulated electric wire around a core which is preferably made from a magnetic material such as soft iron. A magnetic field is produced when an electrict current is passed through the coil and the strength of this magnetic field is directly proportional to the number of turns of wire forming the coil and also to the current flowing in the coil. The insulated electric wire is connected to a source of direct current to form an electric circuit. A rheostat is inserted in the electric circuit to provide a means for varying the electric current flowing in the electric circuit to thereby regulate the strength of the electro-magnetic field. When an electric current is passed through the coil, magnetic poles are produced at each end of the core. It is preferable to provide a separate electric circuit for each electro-magnet.

Electro-magnet 11 comprises core 33 and coil 14 which is formed by winding wire 15 around core 33. Core 33 is made of iron and is in the form of a half-ring. Wire 15 is connected to a source 42 of direct current to form an electric circuit. Rheostat 39 is connected into this electric circuit and electric switch 45 is provided in the electric circuit for shutting off or turning on the flow of electricity through the electric circuit. When electric current is flowing through the electric circuit, ends 21 and 22 of core 33 become opposite magnetic poles.

Electro-magnet 12 comprises core 34 and coil 16 which is formed by winding wire 17 around core 34. Wire 17 is connected to a source 41 of direct current to form a separate electric circuit. Rheostat 38 and switch 44 are connected into this electric circuit. Ends 23 and 24 of core 34 act as magnetic poles when an electric current passes through the circuit. Electro-magnet 12 is supported to conduit 10 by means of bar 36 as shown in Fig. 2. However, it would be possible to connect electro-magnet 12 to some external support. Electro-magnets 11 and 13 are similarly connected to conduit 10.

Electro-magnet 13 comprises core 35 and coil 18 which is formed by winding wire 19 around core 35. Wire 19 is connected to source 40 of direct current to form a separate electric circuit. Rheostat 37 and switch 43 are connected into this electric circuit. Ends 13 and 26 of core 35 act as magnetic poles when an electric current passes through the electric circuit.

Within conduit 10, magnetically susceptible particles, designated by reference character 20, are held to the inside wall of conduit 10 by means of the magnetic field produced by electro-magnets 11, 12 and 13. Ends 21, 23 and 25 of electro-magnets 11, 12 and 13, respectively, act as magnetic poles which are magnetically opposite to ends 22, 24 and 26, respectively, which also act as magnetic poles. Thus a portion of magnetic particles 20 are attracted to one side of conduit 10 and are held to that side by the magnetic force from ends 21, 23 and 25 and the remaining portion of magnetic particles 20 are attracted to and held to the opposite side of conduit 10 by the magnetic force from ends 22, 24 and 26. There are, of course, many other forms or arrangements of electro-magnets which could be utilized for this purpose which are well known to those skilled in the art. For example, in certain instances it may be desirable to employ a magnetic system which will distribute the magnetic force evenly over the entire periphery of conduit 10. All such forms or arrangements are within the scope of this invention.

Figure 1:
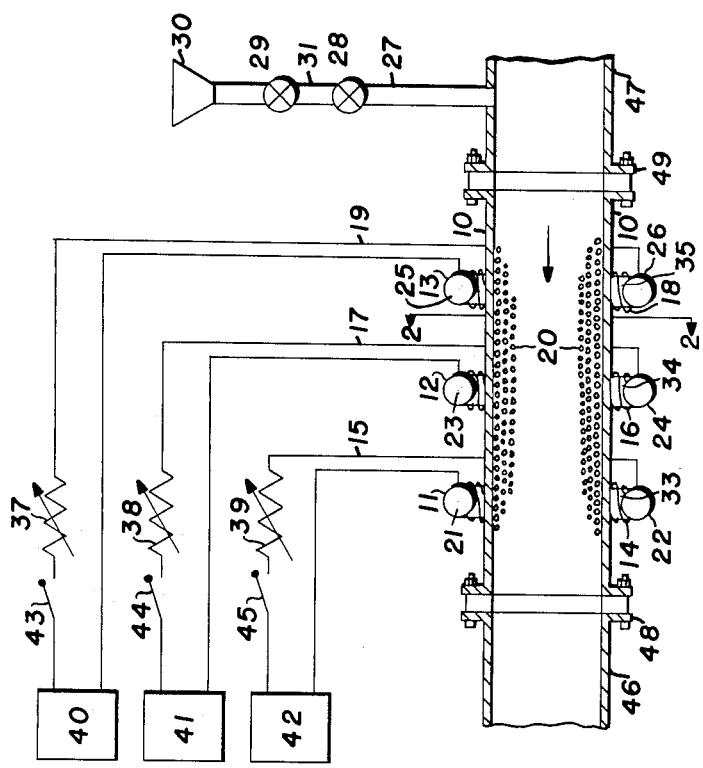
Fig. 1 represents a longitudinal vertical cross section of a conduit containing a valve made in accordance with the present invention showing the valve in the open position.

In Figs. 1 and 2 electro-magnets 11, 12 and 13 produce magnetic fields of essentially equal strength. In this case the magnetic particles 20 are relatively evenly distributed linearly over the inside surface of conduit 10 in the area of the three electro-magnets. As stated previously the strength of the magnetic field will be a function of the current flowing through wires 15, 17 and 19 and also a function of the number of turns in coils 14, 16 and 18. By employing a sufficiently strong magnetic field, loss of magnetic particles 20 due to the force of flow of the fluid or fluidized solids will be negligible. In Figs. 1 and 2, the valve of the present invention is in the open position.

Figure 4:
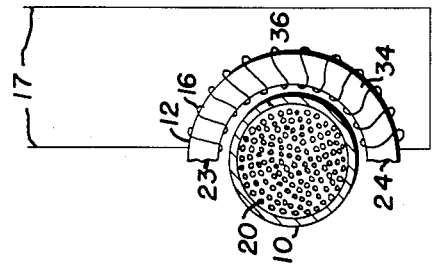
Fig. 4 represents a view similar to Fig. 2 but showing the valve in the closed position.
Figure 3:
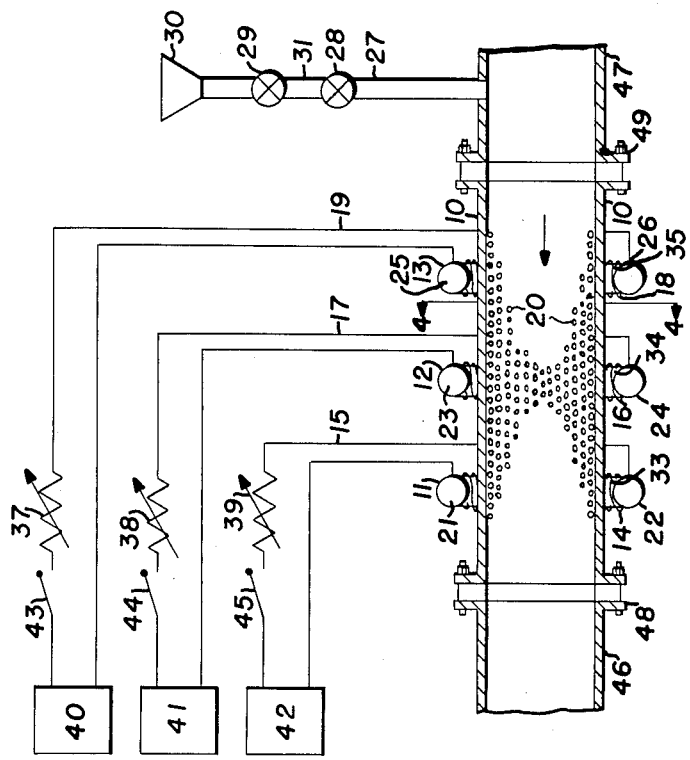
Fig. 3 represents a view similar to Fig. 1 but showing the valve in the closed position.

Fig. 3 and Fig. 4 illustrate the valve made in accordance with the present invention in the closed position. To close the valve, the relative strength of the magnetic field produced by electro-magnet 12 is increased compared to the strengths of the magnetic fields produced by electro-magnets 11 and 13. This may be accomplished by decreasing the strengths of the magnetic fields of electro-magnets 11 and 13 by increasing the resistances in rheostats 39 and 37, respectively, to decrease the flow of electric current in wires 15 and 19, respectively, or by increasing the strength of the magnetic field of electro-magnet 12 by decreasing the resistance in rheostat 38 to increase the flow of electric current in wire 17 or by a combination of these two methods. When the relative strength of the magnetic field produced by electro-magnet 12 is increased the magnetic particles 20 concentrate in the area of electro-magnet 12 by moving away from electro-magnets 11 and 13. The concentration of magnetic particles in the area of electro-magnet 12 results in the closing of the magnetic valve. It is necessary to employ sufficient magnetic particles to permit complete closing of the magnetic valve.

By varying the relative strength of electro-magnets 11, 12 and 13, as previously described, the opening formed by magnetic particles 20 may be changed to any size that is desired. In this manner, control of the flow of fluid or fluidized solids is accomplished.

The present invention is not necessarily restricted to the use of three electro-magnets. Only two electro-magnets are required for effective control of the fluid or fluidized solids flow, but utilization of more magnets is within the spirit of the present invention. It is even possible in certain instances to produce effective flow control with one magnet. Thus, in cases where it is permissible to have the magnetic particles circulate with the fluid or fluidized solids, effective flow control can be obtained by varying the strength of the magnet to thereby vary the amount of magnetic particles held to the inside surface of the conduit in the area of the magnet. A limited degree of control may also be obtained with one magnet in the case where the magnetic particles are not allowed to circulate with the fluid or fluidized solids by varying the strength of the magnet. Increasing the strength of the magnet concentrates the magnetic particles whereas decreasing the strength of the magnet permits the particles to spread out along the conduit. However, the degree of control is not as effective as that which can be obtained with two or more magnets.

Also, the present invention is not restricted to the utilization of electro-magnets. It is possible to use permanent magnets, in which case the relative strengths of the magnetic fields can be varied either by changing the positions of the permanent magnets with respect to the conduit or by using adjustable magnetic shunts in combination with the permanent magnets. It is also possible to obtain the results of the present invention by winding at least two separate insulated electric wires in the form of separate coils spaced from each other around conduit 10 to obtain a magnetic field which would serve the same function as that described in the preferred form of the present invention.

It is preferable to make conduit 10 of a material which in non-magnetic, as this reduces the magnetic leakage. Such non-magnetic materials as stainless steel, bronze or plastic are suitable for this purpose. In this way, the electrical power consumption required for the operation of electro-magnets is reduced as magnetic leakage is held to a minimum. It is possible, if necessary, to make conduit 10 of a magnetic material. To do this effectively, conduit 10 should be magnetically insulated from conduits 46 and 47 to which it connects by employing gaskets made of asbestos, synthetic rubber, etc. between the flanged connections 48 and 49 joining conduit 10 with lines 46 and 47, respectively. Such materials have a high magnetic reluctance and reduce the leakage of magnetic flux from conduit 10.

Magnetic particles 20 may be made of iron, cobalt, nickel, mixtures thereof, alloys, magnetic compounds or other magnetic material. They may be made of equal sizes, but it is preferable to have a range of sizes so as to produce a more compact layer. It is desirable to employ particles in the form of small spheres as this facilitates the movement of the particles when varying the thickness of the layer of particles inside the conduit, but the invention is not to be considered restricted to the use of spheres above. Particles in the size range of 0.005 to 0.1 inch in diameter are preferred.

Makeup magnetic particles to replace those particles that have been eroded, corroded or lost may be introduced to the system by adding them to the system with the fluid or fluidized solids. If this is not feasible, the makeup magnetic particles may be added by a means such as line 27 shown in Figs. 1 and 3. Line 27 which is located upstream of the magnetic valve communicates with conduit 47 and contains valves 28 and 29. Connected to the top of line 27 is hopper 30. When fluids or fluidized solids are passing through conduit 10, valves 28 and 29 are in a closed position. Make-up magnetic particles are added to hopper 30. Valve 29 is then opened to allow the makeup magnetic particles to drop into section 31 of line 27. Then valve 29 is closed and valve 28 is opened permitting the make-up magnetic particles to drop into conduit 47 where they are carried by the motion of the fluid or fluidized solids to the location of the magnetic field. At this point the particles are attracted to the wall of conduit 10 and are held there by the magnetic force.

In an operation, for example, where particles consisting of iron would be undesirable, the particles may be coated with another material. Thus, in the case of catalytic cracking of petroleum, the iron particles may be coated with a substance such as silica-alumina or silica-magnesia in order to minimize iron contamination of the fluidized catalyst.

The present invention is especially adapted for use in apparatus in which finely divided fluidized solids are circulated through a reaction system where severe erosion of valves such as slide valves is experienced. The present invention provides a means of eliminating the disadvantages encountered with these slide valves as the magnetic valve requires no packing nor lubrication and in addition worn out parts may be replaced without interrupting the operation of the process.

The present invention was employed to regulate the flow of air through a ⅜" I. D. and 36" long glass conduit which was arranged in a vertical position. The air was introduced to the bottom of the glass conduit so that it would flow through the conduit and pass out the top to the atmosphere. Prior to the introduction of magnetic particles into the glass conduit the air rate was set at 16.2 feet/second. Two pairs of permanent bar magnets were employed to produce the magnetic fields required. Each bar magnet was ¾" x ¾" x 2" in size and had a magnetic strength of 1000 gauss. The two magnets of each pair were placed opposite each other about the glass conduit and the two pairs of magnets were spaced 12" from each other such that each pair was 12" from one end of the glass conduit. Twenty-five grams of iron filings of 20 mesh size were introduced into the top of the glass conduit and they fell in the conduit until they reached the magnetic fields produced by the bar magnets. The air rate was reduced to 10.2 feet/second due to the presence of the iron filings in the glass conduit. The two pairs of magnets were then moved towards each other until they contacted each other in order to concentrate the magnetic field to thereby concentrate the iron filings. The air rate was reduced to 7.7 feet/second. The two pairs of magnets were then returned to their original positions such that they were again spaced 12" from each other and the air rate was thereby increased to 10.2 feet/second due to the spreading out of the iron filings in the conduit. During the movement of the magnets from one position to the other, the concentration of iron filings changed accordingly and the air rate varied between 7.7 and 10.2 feet/second. Thus, a desired intermediate air rate was obtained by moving the bar magnets to an intermediate position so as to produce that particular air rate.

What is claimed is:

1. In a conduit defining a flow path for fluids and for substantially non-magnetizable fluidized solids, a means for controlling flow through said conduit, comprising a longitudinally limited section of said conduit, a series of at least two magnets disposed exteriorly of said conduit in spaced relation one to another longitudinally of said conduit section and intermediate the ends thereof, each of said magnets adapted to establish a magnetic field through said section, a plurality of discrete, magnetizable, solid particles disposed within said conduit section, and substantially maintained therein subject to the force fields of said magnets, and means for varying the total force of said magnetic fields and of the individual magnetic fields so as to vary the distribution pattern of said particles between a substantially annular pattern adapted to pass fluids and fluidized non-magnetic solids through said section, and a substantially diametric pattern adapted to intercept said fluids and fluidized solids.

2. An apparatus according to claim 1, wherein said plurality of discrete, magnetizable solid particles constitutes an assortment of particles of different greatest dimension in the range of from about 0.005 to about 0.1 inch.

3. An apparatus according to claim 1, wherein said discrete, magnetizable solid particles are spherical particles.

4. An apparatus according to claim 3, wherein said spherical particles have a substantially uniform diameter in the range of from about 0.005 to about 0.1 inch.

5. An apparatus according to claim 1, wherein said discrete, magnetizable solid particles are coated particles.

6. An apparatus according to claim 1, wherein said discrete, magnetizable solid particles include a surface coating of a material substantially similar in composition to that of a fluidized solid material contained in said conduit.

7. An apparatus according to claim 1, comprising in addition, a branch conduit opening at one end into said conduit defining said flow path adjacent the upstream end of said conduit section and at the other end opening from a reservoir for discrete, magnetizable solid particles, and a pair of valves in said branch conduit disposed in spaced relation longitudinally thereof, whereby said particles may be introduced into said conduit.

References Cited in the file of this patent

UNITED STATES PATENTS

| | | |
|---|---|---|
| 2,505,049 | Keller | Apr. 25, 1950 |
| 2,645,279 | Rossmann | July 14, 1953 |
| 2,670,749 | Germer | Mar. 2, 1954 |